(12) United States Patent
Teufel et al.

(10) Patent No.: US 9,180,799 B2
(45) Date of Patent: Nov. 10, 2015

(54) LOCKING SYSTEM

(75) Inventors: Ingo Teufel, Rockenhausen (DE); Kai Schumann, Rieschweiler-Meuhlbach (DE)

(73) Assignee: KEIPER GMBH & CO. KG, Kaiserslautern (DE)

( * ) Notice: Subject to any disclaimer, the term of this patent is extended or adjusted under 35 U.S.C. 154(b) by 59 days.

(21) Appl. No.: 14/112,218

(22) PCT Filed: Apr. 17, 2012

(86) PCT No.: PCT/EP2012/001646
§ 371 (c)(1),
(2), (4) Date: Nov. 18, 2013

(87) PCT Pub. No.: WO2012/152363
PCT Pub. Date: Nov. 15, 2012

(65) Prior Publication Data
US 2014/0070589 A1  Mar. 13, 2014

(30) Foreign Application Priority Data

May 12, 2011  (DE) .......................... 10 2011 101 876

(51) Int. Cl.
*B60N 2/02* (2006.01)
*B60N 2/20* (2006.01)
*B60N 2/36* (2006.01)

(52) U.S. Cl.
CPC ................ *B60N 2/206* (2013.01); *B60N 2/366* (2013.01)

(58) Field of Classification Search
USPC ............................ 297/378.13, 378.12, 378.14
See application file for complete search history.

(56) References Cited

U.S. PATENT DOCUMENTS

| | | | | |
|---|---|---|---|---|
| 7,226,129 B2* | 6/2007 | Brandes et al. | .......... | 297/378.13 |
| 7,377,584 B2* | 5/2008 | Griswold et al. | ........ | 297/216.12 |
| 7,404,605 B2* | 7/2008 | Inoue et al. | ............. | 297/378.13 |
| 7,416,254 B2* | 8/2008 | Jennings | .................. | 297/378.12 |
| 2007/0200410 A1* | 8/2007 | Inoue et al. | ............. | 297/378.13 |

(Continued)

FOREIGN PATENT DOCUMENTS

| | | |
|---|---|---|
| DE | 10 2008 033 304 A1 | 1/2010 |
| DE | 10 2009 056 155 A1 | 8/2011 |

(Continued)

OTHER PUBLICATIONS

Notification of Transmittal of Translation of the International Preliminary Report on Patentability mailed Nov. 21, 2013, as received in corresponding International Application No. PCT/EP2012/001646.

(Continued)

*Primary Examiner* — David R Dunn
*Assistant Examiner* — Alexander Harrison
(74) *Attorney, Agent, or Firm* — Foley & Lardner LLP

(57) ABSTRACT

A locking system for a vehicle seat, for locking to a vehicle structure of a vehicle, has a backrest able to be folded from a normal position into a folded position, a locking device located on the backrest, and a catch that can be pivoted between a locking position and an unlocking position and can be pivotally driven by both a manually-pivotable unlocking element and an actuation device arranged on the vehicle structure. When the backrest is in the normal position, a counter element is locked to the locking device by the catch. The actuation device has a control lever that can be moved between a locking position and an unlocking position.

11 Claims, 7 Drawing Sheets

(56) References Cited

U.S. PATENT DOCUMENTS

Figure 1:
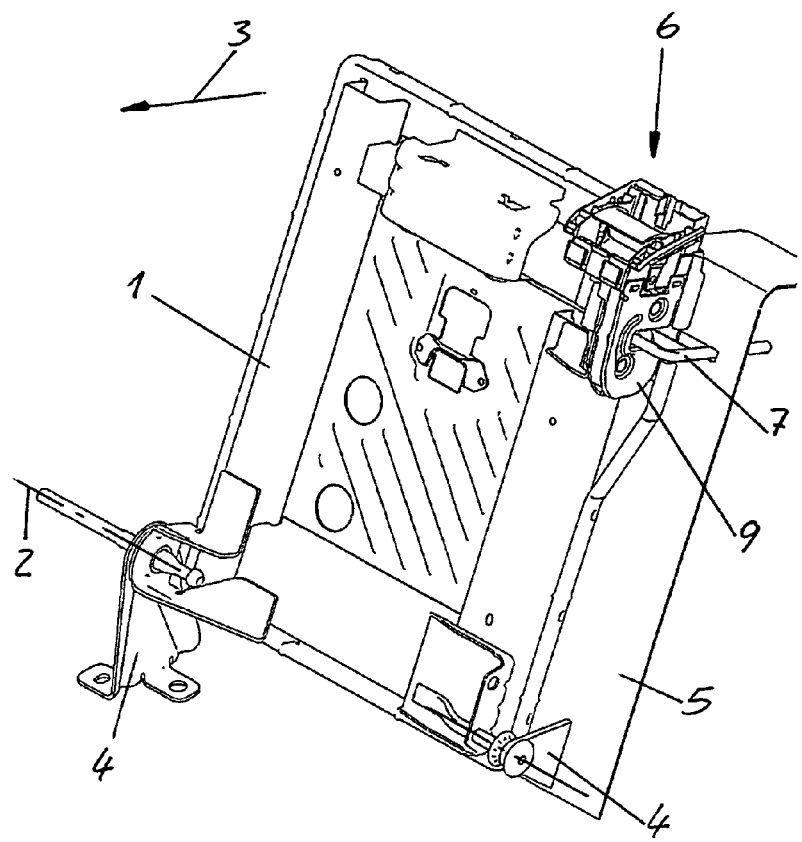

| | | | |
|---|---|---|---|
| 2007/0200411 A1* | 8/2007 | Inoue et al. | 297/378.13 |
| 2009/0008981 A1 | 1/2009 | Wieclawski | |
| 2011/0006576 A1* | 1/2011 | Muller et al. | 297/378.13 |
| 2011/0006577 A1* | 1/2011 | Muller et al. | 297/378.13 |
| 2011/0012415 A1* | 1/2011 | Muller et al. | 297/378.13 |
| 2012/0193963 A1* | 8/2012 | Lutzka et al. | 297/378.13 |

FOREIGN PATENT DOCUMENTS

| | | |
|---|---|---|
| JP | 57-200446 | 12/1982 |
| JP | 60-114035 | 8/1985 |
| JP | 2007-045213 | 2/2007 |
| JP | 2011-051574 | 3/2011 |
| WO | WO-2010/003587 A1 | 1/2010 |

OTHER PUBLICATIONS

International Search Report mailed Jun. 29, 2012 as received in corresponding International Application No. PCT/EP2012/001646.

Office Action in corresponding Korean application No. 10-2013-7033066 dated Jan. 27, 2015 and English translation, 15 pages.

\* cited by examiner

LOCKING SYSTEM

CROSS REFERENCE RELATED APPLICATIONS

The present application is a U.S. National Stage of International Application No. PCT/EP2012/001646, filed on Apr. 17, 2012, which claims the benefit of German Patent Application No. 10 2011 101 876.3, filed on May 12, 2011, the entire disclosures of all of which are incorporated herein by reference.

The invention relates to a locking system for a vehicle seat, in particular for a motor vehicle seat, having the features of the preamble of claim 1. The invention also relates to a vehicle seat having the features of claim 11.

PRIOR ART

A generic locking system for locking a backrest of a vehicle seat to a vehicle structure of a vehicle is disclosed in WO 2010/003587 A1, wherein the backrest is able to be folded from an approximately upright normal position about a backrest axis into a folded position inclined in the direction of travel.

In this case, the locking system comprises a locking device arranged in a housing, said locking device comprising a pawl which is able to be pivoted between a locked position and an unlocked position about a pawl axis, said pawl being able to be pivotably driven by an unlocking element which is manually pivotable about a grip axis parallel to the backrest axis, between a locked position and an unlocked position, wherein when the backrest is in the normal position, a counter element arranged on the vehicle structure is locked by the pawl on the locking device in the locked position.

A generic unlocking system for a vehicle seat having a locking device arranged on the backrest is disclosed in DE 10 2009 056 155 A1, by means of which a pivotable pawl which encompasses a counter element on the vehicle structure may be actuated.

An unlocking system for a vehicle seat is disclosed in US 2009 0 008 981 A1, in which a pawl is able to be brought out of engagement with a counter element with a counter element on the vehicle structure, by means of an unlocking element which is manually pivotable and by means of an actuation device arranged on the vehicle structure.

If the previously folded-down backrest is folded from its folded position into its normal position, this may result in a collision of the components of the locking device fastened to the backrest with the components of the actuation device attached to the vehicle structure.

OBJECT

It is the object of the invention to improve a locking system for a vehicle seat, in particular a motor vehicle seat, for locking to a vehicle structure of a vehicle, and thus in particular with a construction which is simple and only comprises a few components, to avoid a collision of the components of the locking device with the components of the actuation device, resulting in damage.

SOLUTION

This object is achieved according to the invention in a locking system for a vehicle seat, in particular for a motor vehicle seat, of the type mentioned in the introduction, by the actuation device having a control lever which is able to be moved between a locked position and an unlocked position, wherein the control lever is operatively connected to the unlocking element when the backrest is in the normal position and when the control lever is in the locked position, and wherein by moving the control lever from its locked position into its unlocked position, the unlocking element is able to be movably driven into its unlocked position and the control lever is not operatively connected to the unlocking element when the control lever is in the unlocked position and when the backrest has been moved from the folded position into the normal position.

The control lever may be pivotable about a control axis parallel to the grip axis, or even movable transversely to its longitudinal extent in a linear manner between the locked position and the unlocked position.

By extending the control lever in the direction of travel, approximate tolerances of the actuation device and the parts of the locking device cooperating therewith may be permitted in all directions, without leading to a collision of these parts which damages the components, when the backrest is folded back from its folded position into its normal position, even if the control lever is in its unlocked position.

As the actuation device is arranged on the vehicle structure and the locking device is arranged on the backrest, and they are connected together merely operatively but not fixedly, the actuation device and the locking device are entirely separate from one another when the backrest is folded down. Thus no parts of the actuation device need to be of flexible configuration and when folding down the backrest no parts need to be entrained with the locking device.

Parts protruding on the rear face of the backrest are avoided as the housing has an opening, through which in the normal position of the backrest the counter element protrudes into the housing.

Advantageously, when the backrest is in the normal position, the control lever protrudes through the same opening into the housing.

Thus, the rear face of the backrest in the folded position forms an entirely flat loading surface without protruding parts.

In a simple embodiment, it is possible that the control lever is able to be driven in a movable manner by the core of a Bowden cable from the locked position into the unlocked position, wherein the Bowden cable may lead into a luggage compartment of the vehicle and the core thereof is able to be subjected to a pulling force by a pulling device at its end opposing the control lever.

Thus an unlocking of the backrest both from the passenger compartment and from the space located behind the passenger compartment, such as for example the luggage compartment, is possible.

For transmitting the movement of the control lever into its unlocked position onto the unlocking element, a pressure element may be freely pivotably mounted at its one end about a pressure element axis parallel to the pawl axis and, at its end remote from the pressure element axis, is able to be acted upon by the control lever in the direction of the pressure element axis.

Thus an impingement of the pressure element in the direction of the pressure element axis is transmitted to the unlocking element, whilst an impingement of the pressure element not oriented in the direction of the pressure element axis leads to a pivoting of the pressure element about the pressure element axis, and does not act on the unlocking element.

Preferably, in this case the pressure element is a pressure arm.

In this case, the pressure element may be acted upon in a pivotable manner by the pivoting movement of the backrest from the folded position into the normal position by the control lever in its unlocked position, counter to a spring force into an inactive position, in which the unlocking element is not able to be acted upon by the control lever, so that a collision between the components of the actuation device and the locking device leading to damage, is not able to occur.

Without a further adjustment, in particular without folding down the backrest, the control lever may still be restored to its locked position without colliding with other parts, wherein the pressure element also pivots back into its active position.

Preferably, in this case, the pressure element is able to be acted upon in a pivotable manner into the inactive position by the free end of the control lever on the front face.

In order to bring the pressure element after such a deflection back into its normal active position, in which a transmission of movement is possible from the control lever to the unlocking element, a spring arm may be arranged with its one end on the unlocking element, said spring arm bearing with its other end region against the pressure element and by pivoting the pressure element being able to be deflected into the inactive position thereof, increasing the spring tension thereof.

In order to save on the constructional space and a specific retaining device, the control lever may be arranged on the counter element.

Thus, the housing may also have just one single common opening for inserting the control lever and the counter element into the locking device.

Preferably, the counter element is a U-bolt which is engaged from behind by the pawl in the locked position thereof.

If an indication member, guided in a guide between a non-indication position lowered in the guide and an indication position protruding partially outwards from the guide, is able to be driven in a displaceable manner by the unlocking element, wherein the indication member, in the locked position of the unlocking element, is in the non-indication position and, in the unlocked position of the unlocking element, is in the indication position, it is visually indicated by the indication member in the indication position if the unlocking element is in the unlocked position.

The object is also achieved by a vehicle seat having the features of claim 11.

FIGURES AND EMBODIMENTS OF THE INVENTION

Figure 2:
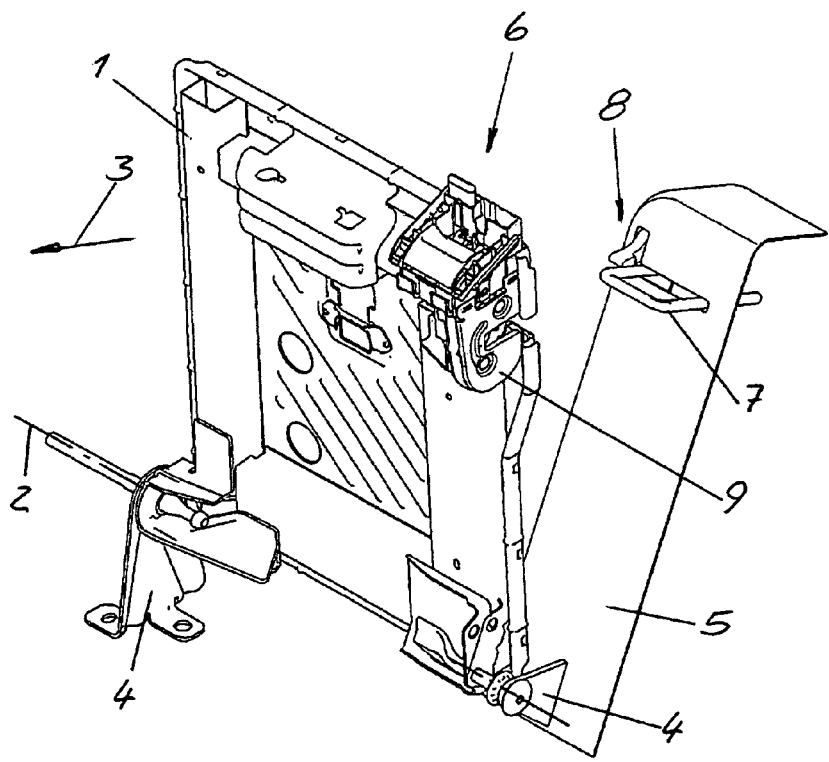
Figure 3:
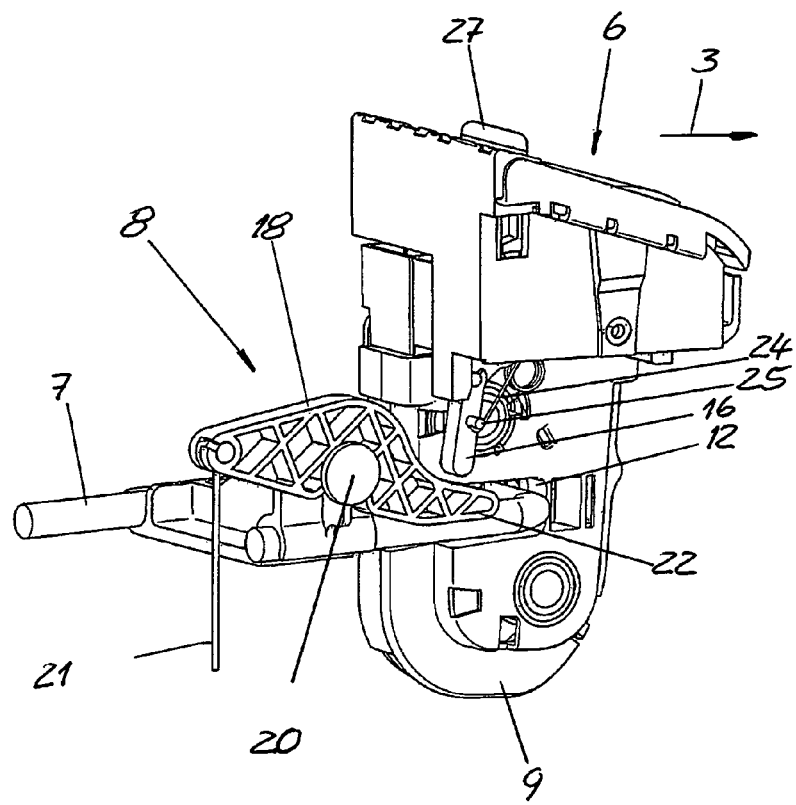
Figure 4:
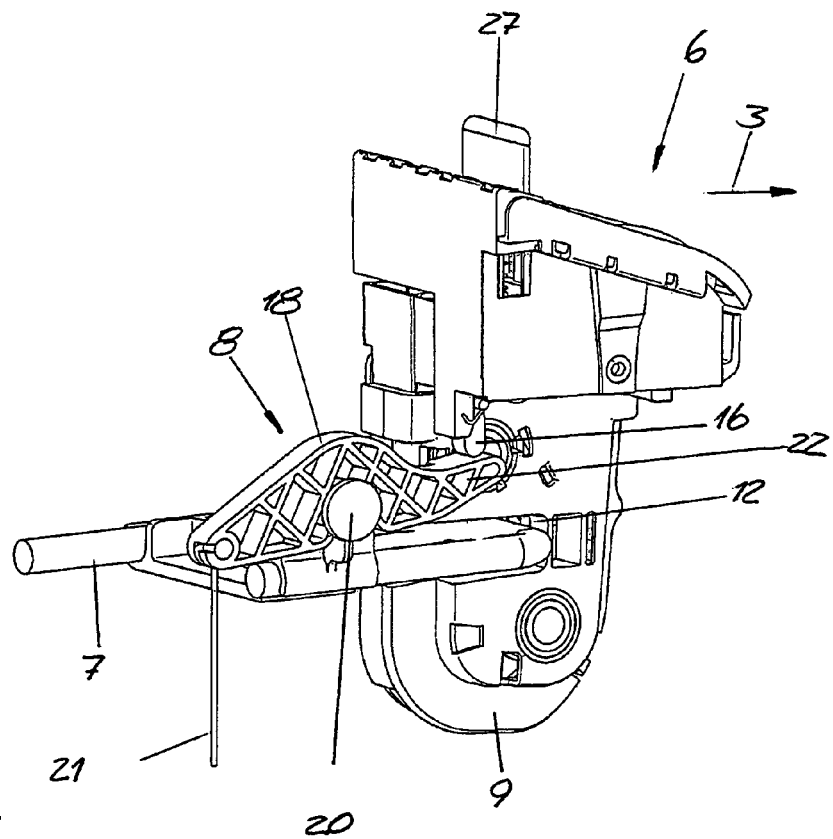
Figure 5:
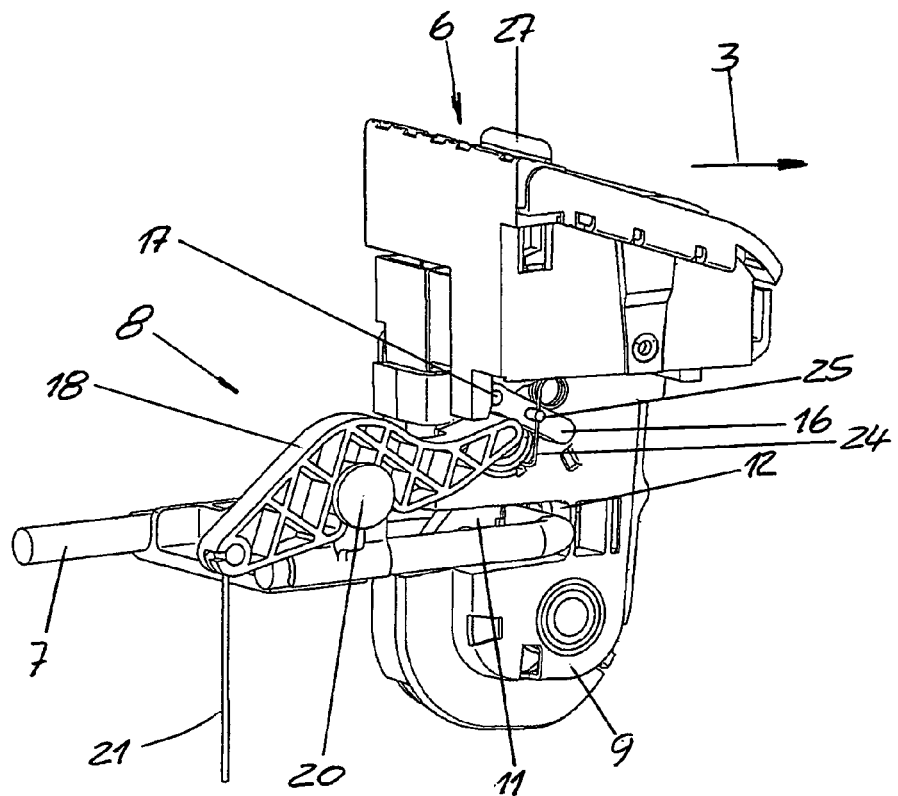
Figure 6:
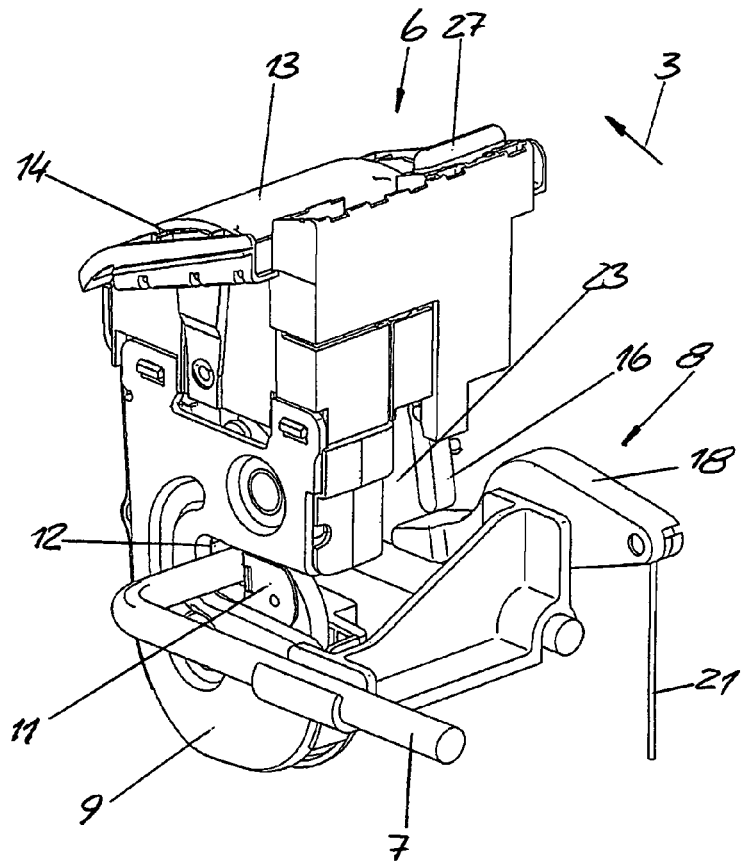
Figure 7:
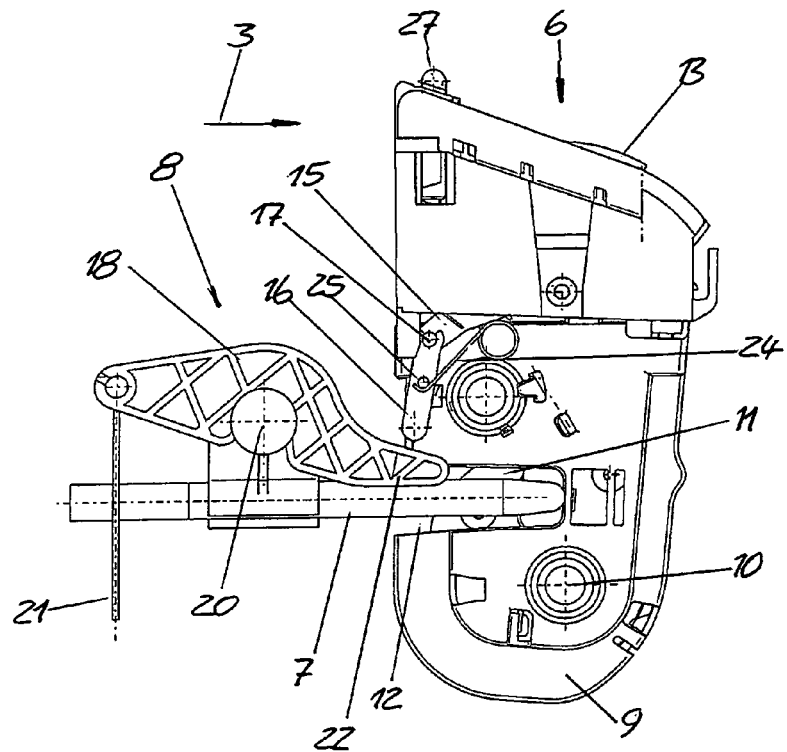
Figure 8:
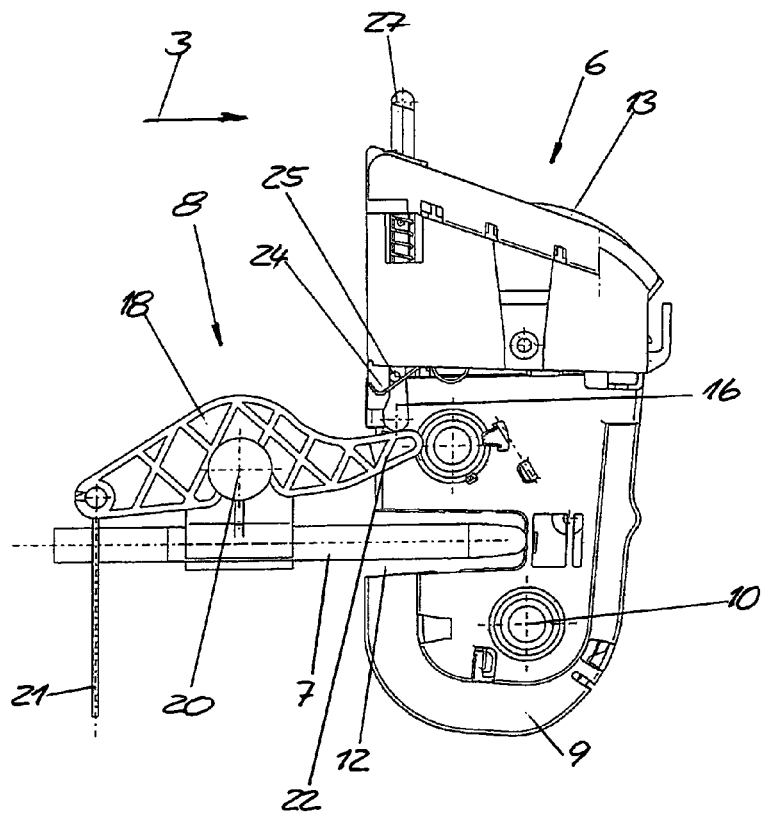
Figure 9:
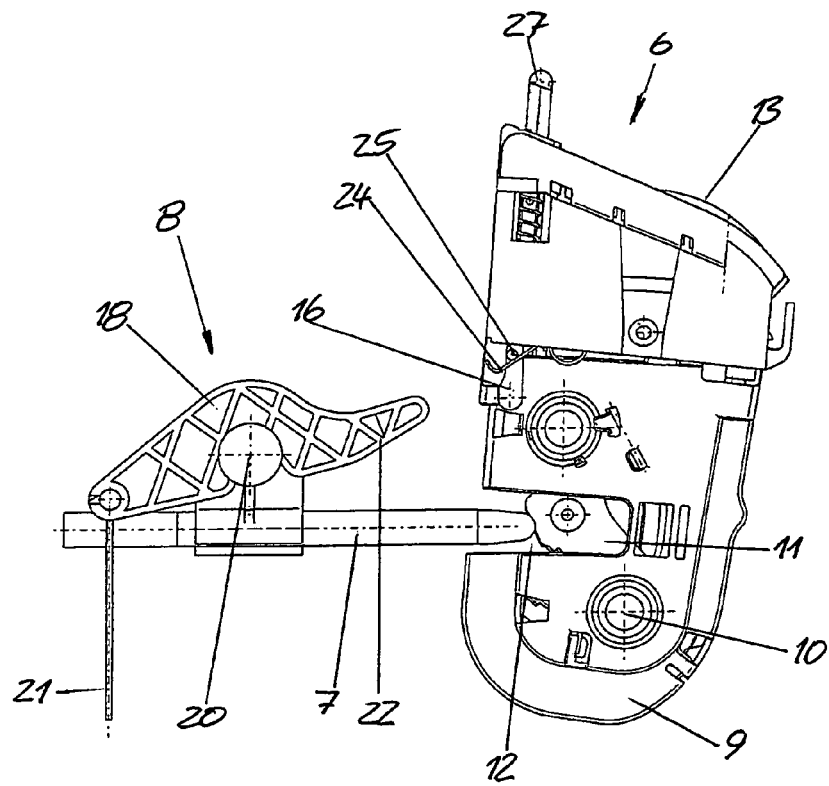
Figure 10:
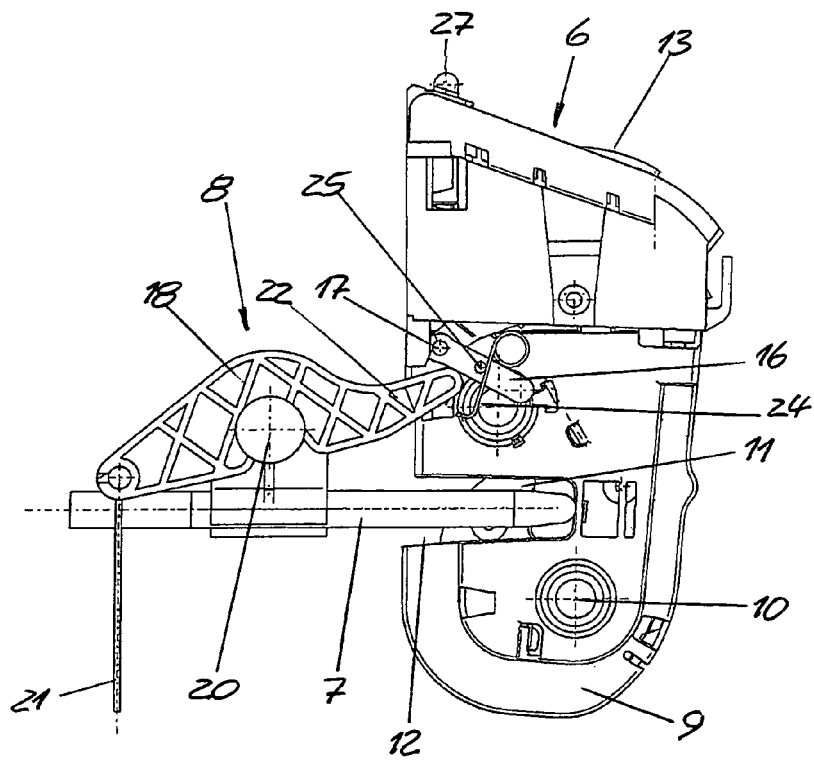
Figure 11:
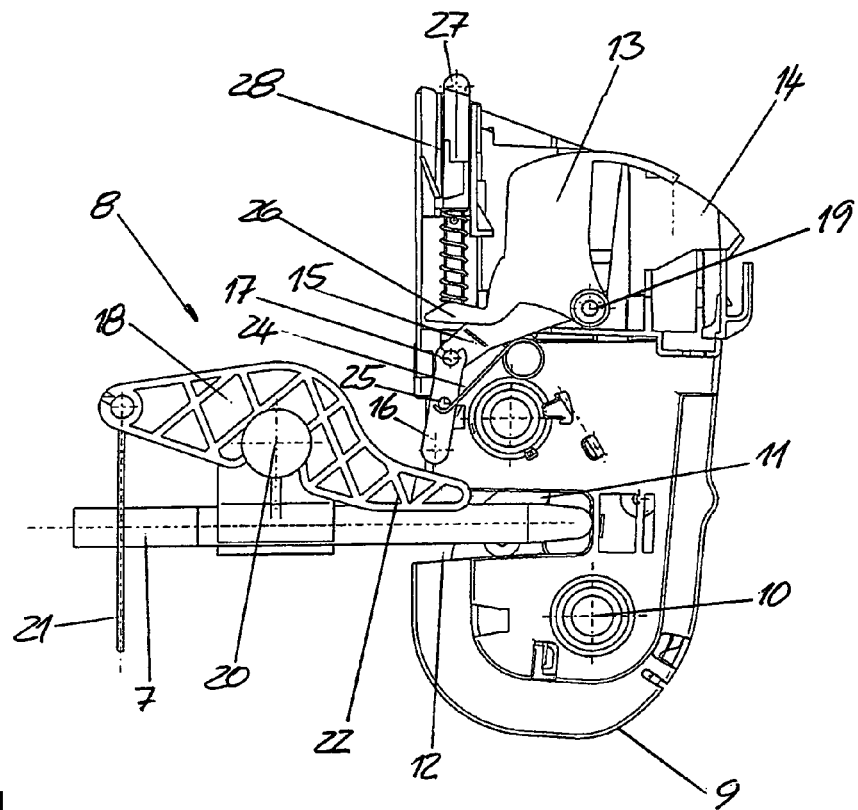
Figure 12:
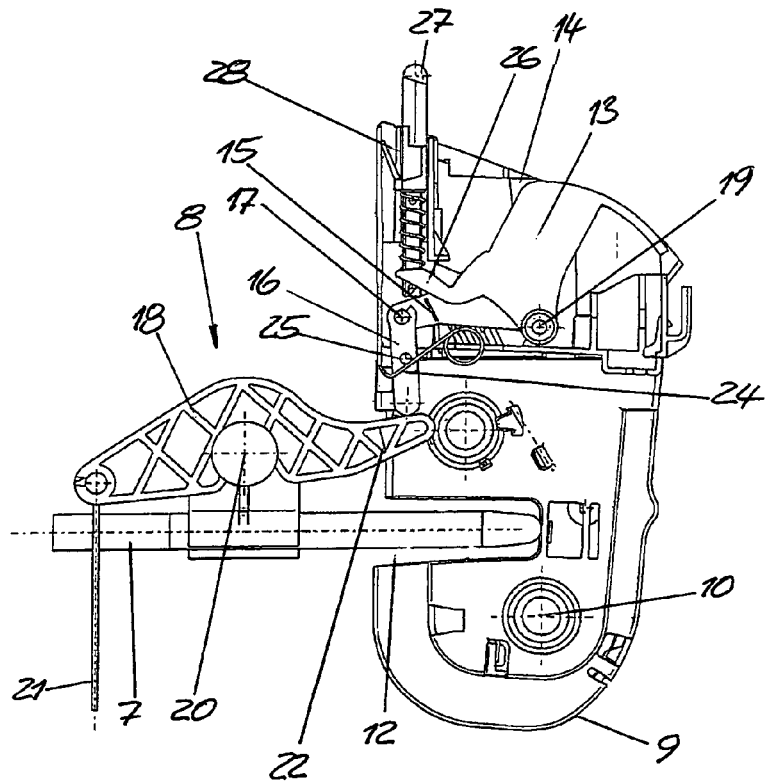
Figure 13:
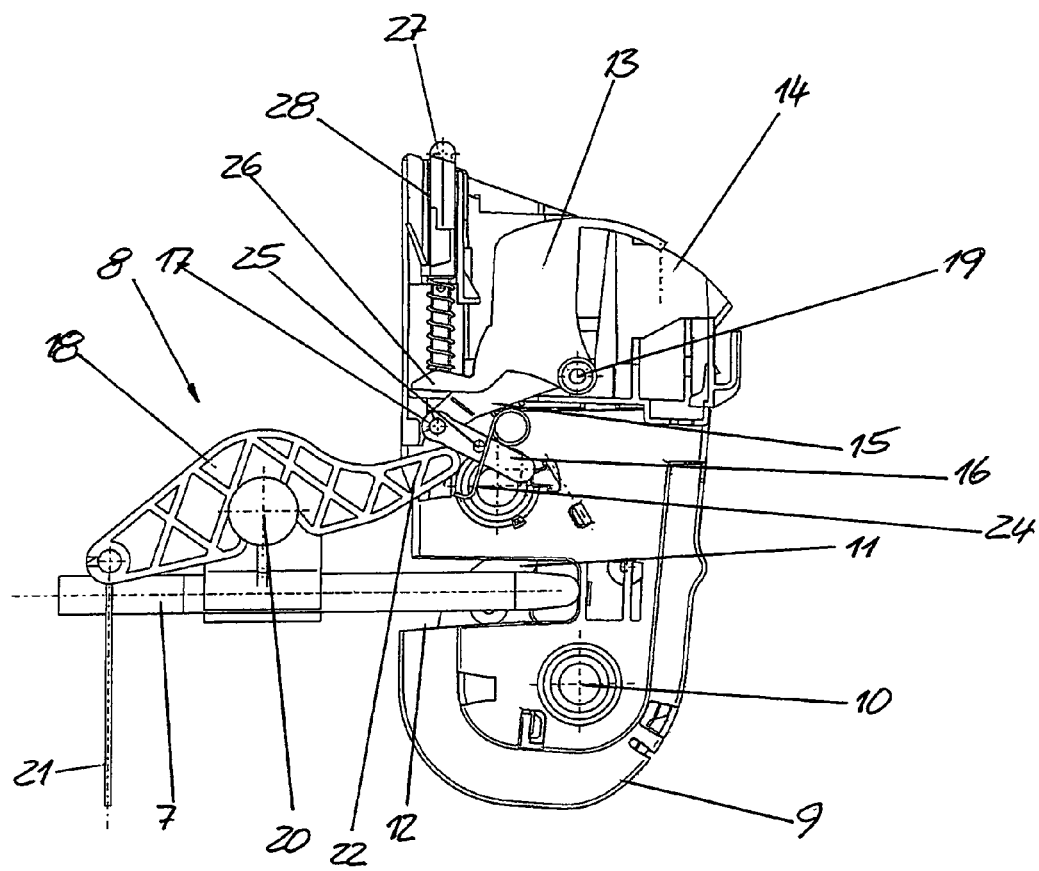

The invention is described in more detail hereinafter with reference to an advantageous exemplary embodiment shown in the drawings. The invention, however, is not limited to said exemplary embodiment. In the drawings:

FIG. 1 shows a perspective view of a locking system having a backrest structure with a locking device and a vehicle structure with an actuation device and a U-bolt in the normal position, FIG. 2 shows the locking system according to FIG. 1 with the backrest structure folded down from the normal position in the direction of travel, FIG. 3 shows a perspective view of the locking system according to FIG. 1 in the normal position of the locking device without the backrest structure and the vehicle structure with a handle in the locked position and a control lever in the locked position, FIG. 4 shows a perspective view of the locking system according to FIG. 3 in the normal position of the locking device with the handle in the unlocked position and the control lever in the unlocked position, FIG. 5 shows a perspective view of the locking system according to FIG. 3 with the locking device pivoted from the folded-down position into the normal position and the handle in the locked position as well as the control lever in the unlocked position, FIG. 6 shows a further perspective view of the locking system according to FIG. 3, FIG. 7 shows a side view of the locking system in a position corresponding to FIG. 3, FIG. 8 shows a side view of the locking system in a position corresponding to FIG. 4, FIG. 9 shows a side view of the locking system according to FIG. 3 in the folded-down position of the locking device, FIG. 10 shows a side view of the locking system in a position corresponding to FIG. 5, FIG. 11 shows a side view of the locking system with the housing partially opened in a position corresponding to FIG. 7, FIG. 12 shows a side view of the locking system with the partially opened housing in a position corresponding to FIG. 8 and FIG. 13 shows a side view of the locking system with the partially opened housing in a position corresponding to FIG. 10.

In FIGS. 1 to 2, a perspective view of a backrest structure 1 of a vehicle seat is shown, said backrest structure being able to be folded forward, in particular into a horizontal position, from its upright normal position (FIG. 1) about a backrest axis 2 on the lower end region thereof in the direction of travel 3.

In the upright normal position, the backrest structure 1 is supported on a vehicle structure 5 and is locked to a locking device 6 fixedly arranged on the backrest structure 1 by a U-shaped U-bolt 7 connected fixedly to the vehicle structure 5.

In this case, the backrest axis 2 extends in a horizontal manner transversely to the direction of travel 3. A bracket 4 of the backrest axis 2 is able to be connected fixedly to the vehicle structure 5.

This lock may be unlocked by an actuation device 8 fixedly arranged on the U-bolt 7.

The locking device 6 is arranged in a housing 9 and has a pawl 11 which is able to be pivoted about a pawl axis 10 parallel to the backrest axis 2, through which the U-bolt 7 inserted into a slot-like receiver 12 of the housing 9 is able to be encompassed and locked in the normal position of the backrest structure 1.

The pawl 11 is able to be driven directly or indirectly in a pivotable manner by a handle 13 forming an unlocking element, from its locked position into its unlocked position. The handle 13 is able to be manually pivoted via an actuating opening 14 accessible on the upwardly oriented side of the housing 9 and about a grip axis 19 parallel to the backrest axis 2.

On a first handle arm 15 of the handle 13 a pressure arm 16 is freely pivotably mounted with its one end about a pressure element axis 17 parallel to the pawl axis 10. The pressure arm 16 is pressed by a spring arm 24 which is fastened with its one end to the first handle arm 15, and with its freely protruding other end bears against a pin 25 of the pressure arm 16, into an active position oriented vertically downwards.

The actuation device 8 has a two-arm control lever 18 extending substantially in the direction of travel 3, said control lever being pivotably arranged on the U-bolt 7 about a control axis 20 parallel to the grip axis 19. In this case, the control lever is oriented in order to reduce tolerances, preferably clipped on.

The core 21 of a Bowden cable leading to a luggage compartment of the vehicle extends approximately vertically downward from the rear end of the control lever 18 in the direction of travel 3. By pulling the core 21, the control lever 18 is able to be pivoted out of its locked position into its unlocked position.

In the locked position, the control lever 18 with its front end in the direction of travel 3 is slightly inclined downward and in the unlocked position with its front end in the direction of travel 3 is slightly inclined upward.

If the backrest structure 1 is in a position folded down from the vehicle structure 5, which is denoted as the folded position, and the control lever 18 is in its locked position and the backrest structure 1 is folded into its normal position, the U-bolt 7 and the front end region 22 of the control lever 18 in the direction of travel 3 are moved in a relative manner through an opening 23 in the housing 9 into the receiver 12.

The U-bolt 7 in this case deflects the pawl 11, which then resiliently encompasses and locks the U-bolt 7 again. The front end region 22 in this case extends below the downwardly oriented free end of the pressure arm 16.

If the backrest structure 1 is now intended to be unlocked again, this may take place by pivoting the handle 13 out of the locked position into the unlocked position, wherein the handle 13 moves the pawl 11 from the locked position into the unlocked position and releases the U-bolt 7, so that the backrest structure 1 may be folded down.

It is, however, also possible that by pulling the core 21 of the Bowden cable the control lever 18 is pivoted from its locked position into its unlocked position, wherein the front end region 22 of the control lever 18 comes to bear against the downwardly oriented front face of the pressure arm 16, and with a force oriented in the direction of the pressure element axis 17 lifts the pressure arm 16 in the direction of its longitudinal extent, and at the same time pivots the first hand lever arm 15 and therewith the handle 13 from its locked position into its unlocked position, whereby the pawl 11 is moved from its locked position into its unlocked position.

If the backrest structure 1 is in its folded position and is intended to be folded back into its upright normal position, and the control lever 18 is in its unlocked position, the pressure arm 16 is acted upon from the front face of the front end region 22 of the control lever 18 transversely to its longitudinal extent and pivoted about the pressure element axis 17 counter to the force of a spring arm 24 from its vertical position into a deflected inactive position (FIGS. 5, 10, 13).

This does not lead, however, to a collision of the parts of the locking device 6 and the actuation device 8 which could be potentially damaging.

The U-bolt 7 is again encompassed by the pawl 11 and, in a subsequent movement of the control lever 18 into the locked position, the pressure arm 16 is pivoted back by the spring arm 24 into its active position.

The handle 13 also has a radially protruding second hand lever arm 26 through which an indication member 27 is able to be displaceably driven from a non-indication position lowered in a guide 28 into an indication position protruding partially from the guide and the housing.

The indication member 27 is in the non-indication position when the handle 13 in the locked position and in the indication position when the handle is in the unlocked position 13.

The features disclosed in the above description, the claims and the drawings may be of significance both individually and in combination for implementing the invention in its various embodiments.

LIST OF REFERENCE NUMERALS

1 Backrest structure
2 Backrest axis
3 Direction of travel
4 Bracket
5 Vehicle structure
6 Locking device
7 U-bolt
8 Actuation device
9 Housing
10 Pawl axis
11 Pawl
12 Receiver
13 Handle
14 Actuating opening
15 First handle arm
16 Pressure arm
17 Pressure element axis
18 Control lever
19 Grip axis
20 Control axis
21 Core
22 Front end region
23 Opening
24 Spring arm
25 Pin
26 Second hand lever arm
27 Indication member
28 Guide

The invention claimed is:

1. A locking system for a vehicle seat, for locking to a vehicle structure of a vehicle, comprising:
a backrest which is able to he folded from an approximately upright normal position about a backrest axis into as folded position inclined in the direction of travel;
a locking device arranged on the backrest which is arranged in a housing and comprises a pawl which is able to be pivoted between a locked position and an unlocked position about a pawl axis,
wherein said pawl is configure to be pivotably driven by an unlocking element which is manually pivotable about a grip axis parallel to the backrest axis, between a locked position and an unlocked position, and said pawl is configured to be pivotably driven by an actuation device arranged on the vehicle structure,
wherein, when the backrest is in the normal position and the pawl is in the locked position, the pawl is configured to lock to a counter element arranged on the vehicle structure to lock the counter clement and vehicle structure to the locking device,
wherein the actuation device has a control lever which is able to be moved between a locked position and an unlocked position,
wherein the control lever is operatively connected to the unlocking element when the backrest is in the normal position and the control lever is in the locked position, such that moving the control lever from its locked position into its unlocked position causes the unlocking element to be movably driven into its unlocked position,
wherein the control lever is not operatively connected to the unlocking element when the backrest is in the normal position and the control lever is in the unlocked position and when the backrest has been moved from the folded position into the normal position with the control lever in the unlocked position.

2. The locking system as claimed in claim 1, wherein the housing has an opening through which, in the normal position of the backrest, the counter element protrudes into the housing.

3. The locking system as claimed in claim 2, wherein, when the backrest is in the normal position, the control lever protrudes through the opening into the housing.

4. The locking system as claimed in claim 1, wherein the control lever is able to be driven in a movable manner by the core of a Bowden cable from the locked position into the unlocked position.

5. The locking system as claimed in claim 4, wherein the Bowden cable leads into a luggage compartment of the vehicle and the core thereof is able to be subjected to a pulling force by a pulling device at its end opposing the control lever.

6. The locking system as claimed in claim 1, wherein, for transmitting the movement of the control lever from its locked position into its unlocked position onto the unlocking element, a pressure element is freely pivotably mounted at its one end about a pressure element axis parallel to the pawl axis and, at its end remote from the pressure element axis, is able to be acted upon by the control lever in the direction of the pressure element axis.

7. The locking system as claimed in claim 6, wherein, when the backrest is pivoted from the folded position into the normal position and the control lever is in its unlocked position, the pressure element is pivoted, counter to a spring force, into an inactive position in which the unlocking element is not able to be acted upon by the control lever.

8. The locking system as claimed in claim 7, further comprising a spring arm with one end fastened to the unlocking element and another end bearing against the pressure element, wherein pivoting the pressure element into the inactive position increases the spring tension of the spring arm.

9. The locking system as claimed in claim 1, wherein the control lever is arranged on the counter element.

10. The locking system as claimed in claim 1, wherein an indication member guided in a guide between a non-indication position lowered in the guide and an indication position protruding partially outwards from the guide, is able to be driven in a displaceable manner by the unlocking element, wherein the indication member, in the locked position of the unlocking element, is in the non-indication position and, in the unlocked position of the unlocking element, is in the indication position.

11. The vehicle seat comprising at least one locking system as claimed in claim 1.

* * * * *